US012749629B2

(12) United States Patent
Alhawsawi et al.

(10) Patent No.: US 12,749,629 B2
(45) Date of Patent: Sep. 29, 2026

(54) GRAPHENE SUPERCAPACITOR

(71) Applicant: Abdulsalam Mohammed Alhawsawi, Corvallis, OR (US)

(72) Inventors: Abdulsalam Mohammed Alhawsawi, Corvallis, OR (US); Steven R. Reese, Corvallis, OR (US)

( * ) Notice: Subject to any disclaimer, the term of this patent is extended or adjusted under 35 U.S.C. 154(b) by 189 days.

(21) Appl. No.: 18/509,576

(22) Filed: Nov. 15, 2023

(65) Prior Publication Data

US 2024/0186075 A1 Jun. 6, 2024

Related U.S. Application Data

(60) Provisional application No. 63/425,556, filed on Nov. 15, 2022.

(51) Int. Cl.
*H01G 11/56* (2013.01)
*H01G 11/84* (2013.01)
*H01G 11/30* (2013.01)
*H01G 11/36* (2013.01)

(52) U.S. Cl.
CPC ............. *H01G 11/56* (2013.01); *H01G 11/84* (2013.01); *H01G 11/30* (2013.01); *H01G 11/36* (2013.01)

(58) Field of Classification Search
CPC ........ H01G 11/56; H01G 11/84; H01G 11/30; H01G 11/36; H01G 11/86
See application file for complete search history.

(56) References Cited

U.S. PATENT DOCUMENTS 8,981,346 B1 * 3/2015 Kamin .................. H10F 39/103 257/29
9,105,406 B2 * 8/2015 Eilertsen ................ H01G 9/145
10,586,651 B2 * 3/2020 Goelzhaeuser ........ H01G 4/008
11,424,081 B2 * 8/2022 Zhi ......................... H01M 4/38
11,749,466 B1 * 9/2023 Hassan ................ H01G 9/2031 136/254
11,862,396 B1 * 1/2024 Hassan .................. H01G 11/84
2015/0077899 A1 * 3/2015 Welch .................... H01G 11/36 361/502
2015/0275353 A1 * 10/2015 Wang .................. C23C 14/5873 204/192.17
2017/0140873 A1 * 5/2017 Goelzhaeuser ........ H01G 4/206
2018/0254318 A1 * 9/2018 Pohlman, III ......... H10D 1/696
2019/0228910 A1 * 7/2019 Goelzhaeuser ........ H01G 11/86
2020/0295370 A1 * 9/2020 Yu .......................... H01G 11/02
2021/0008628 A1 * 1/2021 Arsalan ............... H01M 4/1393
2024/0186075 A1 * 6/2024 Alhawsawi ............ H01G 11/56

FOREIGN PATENT DOCUMENTS

KR 101626019 B1 * 5/2016 ............. H01G 11/26
WO WO-2012170749 A2 * 12/2012 ............. B82Y 40/00
WO WO-2013126915 A1 * 8/2013 ............. H01G 11/84
WO WO-2015197834 A1 * 12/2015 ............... H01G 4/32
WO WO-2023039571 A1 * 3/2023 ............. H01G 11/86

OTHER PUBLICATIONS

WO '915 Translation (Year: 2013).*

* cited by examiner

*Primary Examiner* — Dion R. Ferguson
(74) *Attorney, Agent, or Firm* — WCF IP

(57) ABSTRACT

Provided herein is a supercapacitor containing a perovskite oxide or transition metal oxide substrate, a graphene monolayer arranged on the substrate, and at least two electrodes, wherein the graphene monolayer is arranged between the substrate and the at least two electrodes. Methods for fabricating and charging the supercapacitor are also provided.

7 Claims, 16 Drawing Sheets

GRAPHENE SUPERCAPACITOR

CROSS-REFERENCE TO RELATED APPLICATIONS

This application claims the benefit of U.S. provisional patent application 63/425,556, filed Nov. 15, 2022, the complete contents of which is hereby incorporated by reference.

FIELD OF THE INVENTION

Embodiments of the invention relate to a graphene-based supercapacitor capable of harvesting energy from any heat source such as photons from the sun, combustion motors, and other heat producing bodies.

BACKGROUND OF THE INVENTION

Energy needs are constantly increasing in response to the increasing world population. Developing clean and renewable energy sources is necessary to solve environmental pollution problems. Hydro, wind, and solar energies are of great interest. However, the electricity production from these sources directly depends on climatic conditions. In the case of a rapid change, energy should be stored quickly, requiring low equivalent series resistance for fast charging. Therefore, supercapacitor devices can be ideal for energy storage due to their fast charge-discharge rate, high power density, and long cycling life.

Supercapacitor types include electrochemical double layer capacitor (EDLC), pseudo-capacitor (PC), and hybrid battery type supercapacitor (HSC). A traditional supercapacitor is primarily composed of four components: active electrode, carrier substrate, gel electrolyte, and charge collectors. To date, various active electrode materials have been identified and are usually deposited or printed on inert, flexible carrier substrates. Gel electrolytes are used as electrode separators and ion conductors. The electrodes are usually interfaced with metallic conductors to and for transport of charges. Important performance parameters are capacitance, charge-discharge characteristics, capacitance retention over cycling, and the ratio of energy density to power density. Capacitance values can be normalized over loaded active material (mass), area, or volume of the electrode.

Improved supercapacitors capable of converting light (visible, infrared, UV, and other wavelengths) to a usable electrical signal are needed.

SUMMARY

Described herein are single layer structures (mainly graphene) or hetero-structures made from thin-film materials to produce energy. The photovoltaic and photo-thermoelectric properties of these materials allow them to collect photons at different wavelengths and create photoelectrons in one thin film, which can be used directly or can be amplified in another 2D material. The result is a low power energy source that is robust, small, and inexpensive. This device could require an extremely small external bias (order of mV) to generate a very usable continuous electrical current. The device may also efficiently harvest electromagnetic radiation in the UV range such as the one coming of solar radiation, and infrared range, such as from the human body, to produce energy.

An aspect of the disclosure provides a supercapacitor comprising a perovskite oxide or transition metal oxide substrate, a graphene monolayer arranged on the substrate, and at least two electrodes, wherein the graphene monolayer is arranged between the substrate and the at least two electrodes. In some embodiments, the perovskite oxide substrate is a yttrium aluminum perovskite (YAP) or yttrium aluminum garnet (YAG) substrate. In some embodiments, the YAP or YAG substrate is a cerium doped YAP or YAG substrate. In some embodiments, the supercapacitor contains both a perovskite oxide and a transition metal oxide. In some embodiments, the supercapacitor further comprises a hexagonal boron nitride (hBN) thin film arranged between the graphene monolayer and the at least two electrodes. In some embodiments, the at least two electrodes comprise a conductive epoxy. In some embodiments, the conductive epoxy comprises silver and graphene particles.

Another aspect of the disclosure provides a method for fabricating a supercapacitor comprising arranging a graphene monolayer on a perovskite oxide or transition metal oxide substrate, and providing at least two electrodes, wherein the graphene monolayer is arranged between the substrate and the at least two electrodes. In some embodiments, the graphene monolayer is transferred onto the substrate via a wet transfer process. In some embodiments, the method further comprises arranging a hBN thin film between the graphene monolayer and the at least two electrodes.

Another aspect of the disclosure provides a method of charging a supercapacitor comprising exposing a supercapacitor as described herein to a heat source. In some embodiments, the heat source conducts heat via conduction, convection, or radiation.

DETAILED DESCRIPTION

Figure 1:
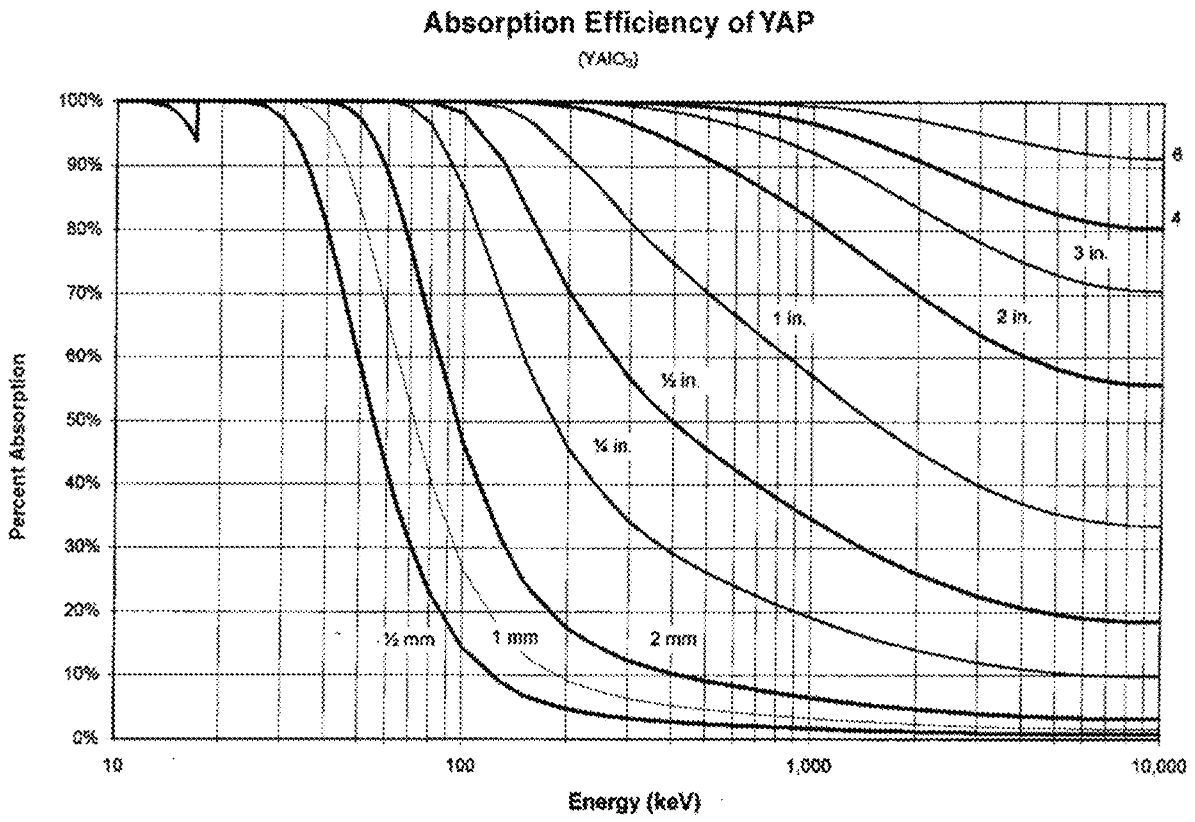
FIG. 1. Gamma radiation absorption in YAP crystals—65% absorption for 60 keV gammas in 1 mm YAP crystal (Saint-Gobain Crystals, Datasheet, 1996).

Embodiments of the disclosure provide a supercapacitor comprising a perovskite oxide or transition metal oxide substrate, a graphene monolayer arranged on the substrate, and at least two electrodes, wherein the graphene monolayer is arranged between the substrate and the at least two electrodes (FIGS. 13-16).

A perovskite is a compound having a general formula $ABX_3$ and that forms a nearly cubic (e.g., orthorhombic) crystal structure similar to the crystal structure of the mineral named perovskite ($CaTiO_3$), which was the first member identified in this class of compounds and for which the class of perovskite compounds is named. In the crystal, A is a cation that resides at the cube corner of the crystal unit cell, B is a cation that resides at the body center of the crystal unit cell, and X is an anion that resides at a face centered position in the unit cell and bonds to both cations. The A cation is typically an alkaline earth metal, rare-earth element, or an alkali element and the B cation is typically a transition or post-transition metal element from periods 4, 5, or 6 in the periodic table, however, perovskites as described herein are not limited to these particular types of ions in the A, and/or B positions. For example, embodiments of the technology provided herein relate to perovskites in which A is an organic cation (e.g., methylammonium ("MA"), formamidinium ("FA")) and B is a lead cation. Embodiments encompass perovskite oxides where X is an oxygen. Perovskite oxides may have the formula $ABO_3$ or $A_2BO_4$.

Exemplary perovskite oxides include, but are not limited to yttrium aluminum perovskite ($YAlO_3$) and yttrium aluminum garnet ($Y_3A_{15}O_{12}$) which are synthetic crystalline materials that are a cubic yttrium aluminum oxide phase in a hexagonal or an orthorhombic, perovskite-like form. YAP and YAG may be doped with various ions including rare earth elements such as cerium, neodymium, erbium, and gadolinium. The % doping can vary and may range from 0.01-10%.

Preferred embodiments of the disclosure utilize a non-hygroscopic, cerium-doped YAP or YAG having the following formulas:

$$YAlO_3: Ce^{3+[0.5\ at\ \%]}$$

$$Y_3Al_5O_{12}: Ce^{3+[0.2\ at\ \%]}$$

Transition metal oxides (TMOs) are compounds composed of oxygen atoms bound to transition metals. The main characteristics of TMOs are the partially filled 3d-shells for the positive metallic cations. The well-known semiconductors $TiO_2$ and $Cu_2O$ are the end points of the 3d transition metal oxide series having $3d^0$ and $3d^{10}$ electronic configurations for the respective cations. These two end-point semiconductors exhibit n-type and p-type conductivity, respectively. The partially filled d-shells in TMOs result in various unique properties such as wide bandgap, high dielectric constant, ferromagnetic and ferrimagnetic states, etc. Exemplary transition metal oxides include, but are not limited to Ruthenium Oxide ($RuO_2$), Manganese Oxide ($MnO_2$), Vanadium Pentoxide ($V_2O_5$) Nickel Oxide (NiO), and Cobalt Oxide ($Co_2O_3$).

The dimensions of the substrate may be on the order of 0.1 nm to 100 nm or larger. In some aspects of the disclosure, the length and width of the substrate may be from about 0.1-100 nm, e.g. about 0.5-20 nm, 1.0-100 nm, e.g. about 0.5-20 mm, e.g. about 5-15 mm. The thickness of the substrate may be from about 0.1-10 nm, e.g. about 0.5-5 nm, e.g. about 0.1-10 mm, e.g. about 0.5-5 mm, e.g. about 0.5-5 cm, e.g. about 10.0-50 cm.

A graphene monolayer is arranged on the substrate. Graphene comprises a single layer of carbon atoms arranged in a hexagonal structure. Graphene comprises a continuous network of $sp^2$ hybridized carbon bonds. As a result, graphene materials have useful properties. For instance, graphene is a zero-bandgap material that absorbs light and generates charge carriers. Further, graphene materials have field-effect sensitivity by which the electronic and optical properties of graphene may be tuned by applying an electric field. Also, graphene has an efficient mobility to silicon of more than two orders of magnitude. Consequently, the efficient mobility of graphene provides efficient carrier dynamics and thus converts photons into electrical signals extremely fast.

The incorporation of graphene in a supercapacitor as described herein is advantageous due to its excellent intrinsic conductivity, high surface-to-volume ratio, exceptionally intrinsic double-layer capacitance (~21 μP/cm$^2$), high theoretical capacitance (550 F/g), flexibility, and overall mechanical robustness. The thickness of the graphene film may vary. As graphene is a monolayer material, the graphene film can be a monolayer film. However, it is also possible that several graphene layers are stacked upon each other on the substrate surface. Preferably, the graphene film has a thickness of 0.1-2 nm. Thickness may be measured by methods known in the art, e.g. using a surface profiler. The graphene film may be polycrystalline comprising grains with different crystallographic orientation.

Graphene film can be prepared by methods known in the art. For example, graphene film can be directly prepared on the substrate by chemical vapor deposition, epitaxial growth, or surface-assisted bottom-up organic synthesis. It is also possible to prepare graphene in an external medium first, followed by applying the graphene onto the substrate so as to form the graphene film, e.g. using a wet transfer process. In the wet transfer process, the graphene may be floated in poly-methyl-methacrylate (PMMA) and scooped onto the substrate. For coating the substrate with the graphene, commonly known methods can be applied, such as spin coating, drop coating, layer by layer self-assembly, electrochemical deposition, filtration, chemical vapor deposition (CVD) or combinations thereof.

As shown in FIGS. 13-16, a second substrate may be arranged under the graphene layer. Suitable materials include, but are not limited to, SiO, SiO2, and Si.

The graphene film can be continuous over a surface area of the perovskite/TMO substrate and/or second substrate as determined by optical microscopy. With the term "continuous", it is meant that the substrate surface is completely covered by the graphene film over the area indicated and no substrate surface is detectable within this area by optical microscopy. In some embodiments, the graphene film covers 80-100% of the substrate surface, e.g. 90-100% or 95-100%. In some embodiments, the device contains pixels with an area of 5 nm×5 nm to 20 nm×20 nm, e.g. 10 nm×10 nm or larger.

In some embodiments, a hexagonal boron nitride (hBN) thin film is arranged on top of the graphene film forming a heterostructure on the substrate. The hBN file may be prepared similarly to the graphene film, e.g. using a wet transfer process. The graphene film is attached to both the substrate and the adjoining hBN film via Van der Waals forces.

Embodiments of the disclosure also provide a method for fabricating a supercapacitor as described herein. The method includes arranging a graphene monolayer on a YAP or YAG substrate, and providing at least two electrodes, wherein the graphene monolayer is arranged between the substrate and the at least two electrodes.

In some embodiments, the electrodes comprise an electrically conductive epoxy. The electrodes may include active materials that directly take part in electrochemical or Faradaic redox reactions, such as metals, metal oxides, metal hydrides, metal sulfides, metal nitrides, metal halides, metal composites, intermetallic compounds, metalloid alloys, or metallic compositions, such as base metals or alloys. Example metals in metal containing compositions include transition metals and specifically one or more of Mn, Zn, Fe, Co, Ni, Cu, Mo, Tc, Ru, V, Bi, Ti, Rh, Pd, Ag, Au, W, Re, Os, La, Na, K, Rb, Cs, Ir, or Pt. The epoxy may be infused with graphene particles. The electrode may have a thickness of 0.1-5 nm depending on the device. In some embodiments, the electrodes may have independent chemical structures. In some embodiments, an electrode comprises the same metal and/or metal containing composition as another electrode. In other embodiments, an electrode comprises a different metal and/or metal containing compositions as another electrode. Optionally, an electrode comprises a metal, metal oxide, a metalloid, and/or a metalloid alloy (i.e., a composition including a metal and a metalloid). Example metalloids include boron, silicon, germanium, arsenic, antimony, carbon, aluminum, and selenium. Optionally, electrodes comprise alternating layers of active material and another material, such as amorphous carbon. In some embodiments, the electrode comprises a graphene layer. In some embodiments, the electrodes are electrically isolated from the perovskite oxide or transition metal oxide substrate.

Current collectors connect the electrodes to the capacitor's terminals. The collector is either sprayed onto the electrode or is a metal foil.

During the charge phase, the TMO or perovskite create photoelectrons that are trapped in heterostructure of the graphene-perovskite material or the graphene-TMO material. These electrons then hold the charge and can be released depending on the voltage applied to the source/drain/gate electrodes. The charging time is usually very fast but the discharge can be controlled via rising the device.

Preferably, the supercapacitor has a stack capacitance of at least 1 $F/cm^3$, more preferably at least 40 $F/cm^3$, even more preferably at least 50 $F/cm^3$. As known to the skilled person, the capacitance value is calculated from the CV data according to the following equation (1):

$$C_{device} = \frac{1}{v(V_f - V_i)} \int_{V_i}^{V_f} I(V)dV \quad (1)$$

wherein v is the scan rate, V and V, are the integration potential limits of the voltammetric curve, and /(V) is the voltammetric discharge current (A). Stack capacitance (sometimes also referred to as volumetric capacitance) is calculated based on the volume of the device stack according to the following formula (2):

$$C_{stack}=C_{devi}JV \quad (2)$$

wherein $C_{stack}$ refers to the volumetric stack capacitance of the device. V is the corresponding total volume of the positive and negative electrodes in the device.

In embodiments, the devices described herein correspond to an all solid-state construction, and do not include any gels or liquids.

In some embodiments, the present disclosure provides arrangements of two or more of the supercapacitors as described herein, wherein at least two of the supercapacitors are connected in parallel or in series.

In some embodiments, the present disclosure provides methods of charging and/or discharging a supercapacitor as described herein. For example, a voltage difference may be applied between the first electrode and a second electrode, such as a charging voltage, in order to charge the supercapacitor. In some embodiments, charging occurs by exposing the supercapacitor to a heat source. In some embodiments, the heat source conducts heat via conduction, convection, or radiation. The change in temperature can lead to the generation of a voltage difference across the device. It will be appreciated that, in embodiments, the charging may occur rapidly or substantially instantaneously, such as within a period of seconds or minutes or a fraction thereof, depending on the current available from the voltage source and resistive losses between the voltage source and the electrodes. This rapid charging may also occur, in embodiments, without damaging the electrodes.

In embodiments, the supercapacitor may be charged and/or discharged at rates of about C/20, about C/10, about C/5, about C/2, about 1 C, about 2 C, about 5 C or about 10 C or more without inducing damage to the energy storage device, such as damage characteristic of capacity loss, electrode destruction, etc. Charging times may also vary depending on charging voltage, charging current, etc. Example charging times may be less than about 1 second, less than about 10 seconds, less than about 30 seconds, less than about 1 minute, less than about 5 minutes, less than about 10 minutes, less than about 30 minutes, between 1 second and 60 minutes, etc.

Further, in some embodiments, the supercapacitor exhibits exceptional cycle lives. For example, the supercapacitor may be charged and discharged any number of times without inducing damage to the device, such as damage characteristic of capacity loss, electrode destruction, etc. For example, the supercapacitor of some embodiments may be charged and discharged more than or about 100 times, more than or about 1000 times, more than or about 10000 times, more than or about 100000 times, more than or about 1000000 times, or between 1 and 1000000 times, without damaging the device, such as damage characteristic of capacity loss, electrode destruction, etc. Supercapacitors are suitable temporary energy storage devices for energy harvesting systems (e.g. from solar power or thermal energy). In energy harvesting systems, the energy is collected from the ambient or renewable sources, e.g., mechanical movement, light or electromagnetic fields, and converted to electrical energy in an energy storage device. In some embodiments, the device is charged by exposing the supercapacitor to a heat source leading to the generation of a voltage difference across the device. In some embodiments, the heat source conducts heat via conduction, convection, or radiation. The device is thus useful for utilizing waste heat, solar heat, or body heat. The supercapacitor may also be used in applications requiring many rapid charge/discharge cycles, e.g. in automobiles, buses, trains, cranes and elevators, where they are used for regenerative braking, short-term energy storage, or burst-mode power delivery. Smaller units may be used as power backup for static random-access memory (SRAM).

In some embodiments, the supercapacitor may have an electrical energy density about 0.1 J/cm$^3$, e.g. 1 J/cm$^3$, e.g. 10 J/cm$^3$, e.g. 100 J/cm$^3$, e.g. 300 J/cm$^3$.

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Below is a description of experiments that proved a device as described herein can hold a charge for several hours and thus can work as a supercapacitor.

Materials and Methods

Perovskite Scintillators Chosen

The crystals chosen for the experiments were Yttrium Aluminum Oxide (YAP) and Yttrium Aluminum Garnet (YAG). Their chemical compound is shown respectively below:

$$YAlO_3{:}\ Ce^{3+[0.5\ at\ \%]}$$

$$Y_3Al_5O_{12}{:}\ Ce^{3+[0.2\ at\ \%]}$$

Figure 2:
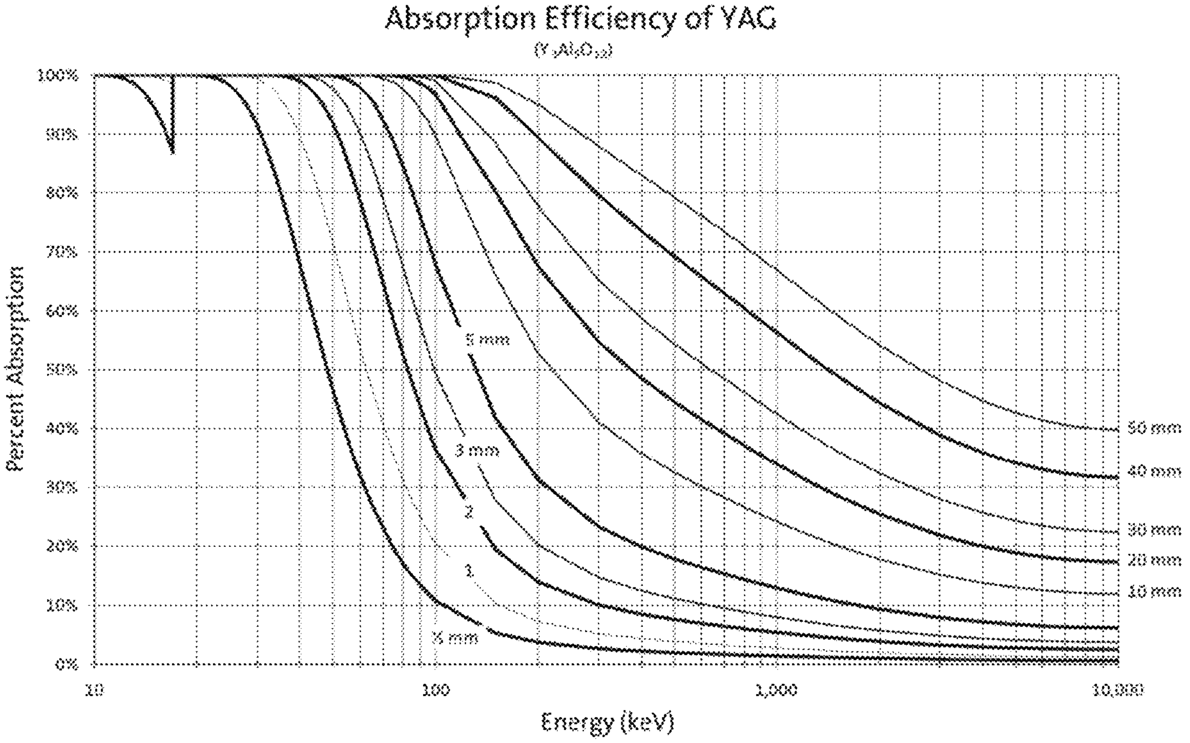
FIG. 2. Gamma radiation absorption in YAG crystals—55% absorption for 60 keV gammas in 1 mm YAG crystal (Saint-Gobain Crystals, Datasheet, 2016).

They are both non-hygroscopic (which is essential when considering the graphene transfer process chosen). They are both chemically inert, and thus non-reactive to any chemicals used in device fabrication. The inorganic oxide scintillators were cut up into 10 mm×10 mm×1 mm size in volume, and then polished on the top and bottom sides to assist with the graphene transfer. A few of the radiation characteristics for the crystals are shown in Table 1, as well as FIGS. 1 and 2 showing gamma ray absorption in YAP and YAG crystals, as a function of incident gamma ray energy—60 keV gammas are 65 percent and 55 percent attenuated in the 1 cm thick crystal respectively.

TABLE 1

| Radiation scintillator characteristics of YAP and YAG crystals | | | | | | | | | |
|---|---|---|---|---|---|---|---|---|---|
| Material | Density $\left[\frac{g}{cm^3}\right]$ | $\lambda_{max}$Emi. [nm] | Decay Time [ns] | Light Yield $\left[\frac{photons}{MeV}\right]$ | Photoelectric Fraction $\left[\frac{Z}{E}\right]$ [% at 511 keV − Photoelectric $\propto \left[\frac{Z}{E}\right]^3$ | Linear Attenuation Coeff. at 511 keV [cm$^{-1}$] | Attenuation Length [cm for 511 keV] | Energy Res. [FWHM % | $Z_{eff}$ |
| YAP: Ce | 5.35 | 355 | 25 | 18,000 | 4.4 | 0.019 | 2.16 | 4.4 | 36 |
| YAG: Ce | 4.56 | 550 | 90 | 11,000 | | 0.017 | 3.28 | 6.0 | 33 |

Transfer of Graphene and Hexagonal Boron Nitride Onto YAP and YAG Substrates

Two dimensional structures can be grown directly onto substrates, which reduces the likelihood of unwanted contaminants that provide doping effects with unwanted results as a consequence. However, most substrates are unable to handle the high temperatures for graphene growth. YAP and YAG are both able to survive the growth environment and hold the same cubic crystal growth structure that the copper substrate is grown on. Unfortunately, vendors are financially set-up to transfer their graphene onto a few select substrates, or custom transfers. For those reasons, the samples have been prepared via the wet transfer process—which requires floating the graphene in poly-methyl-methacrylate (PMMA) and scooping the graphene and hBN thin-films onto our crystal substrates (which is why the crystals being non-hygroscopic is critical). The substrates were first cleaned using the RCA cleaning method, before the wet transfer process took place. The graphene coverage is approximately 95 percent and is polycrystalline (consisting of grains with different crystallographic orientation). The graphene is then measured via Raman spectroscopy, where the ratio of "G" to the "2D" peaks are compared to assure graphene quality. To the best of our knowledge, our research is the first to successfully transfer graphene onto these types of scintillators, and also the first to transfer both hBN and graphene layered together to create a hetero-structure onto the YAG crystal. The thin-films are attached to both the substrate and the adjoining thin-film (hBN) via the Van der Waals force (if the delocalized electrons in graphene participated in chemical bonding, then there would be no charge collection to external stimulus possible to measure).

Electrodes

Figure 3A:
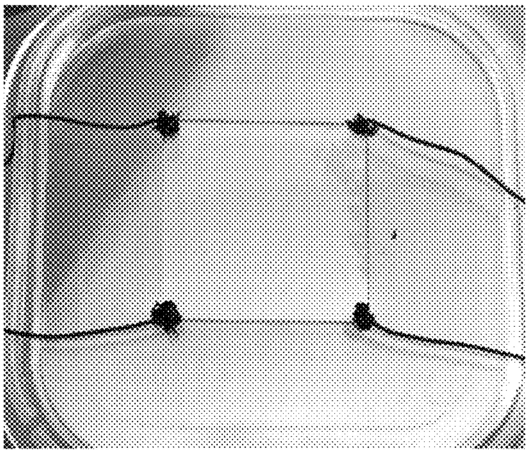
FIGS. 3A-E. (A) Quartz device with four point contact in the corners—geometry 1 (G1). (B) Quartz device with four point contact in a row—geometry 2 (G2) (C) YAP device with a G1 configuration. (D) YAP device with a G2 configuration. (E) YAG device with a G2 configuration.
Figure 3B:
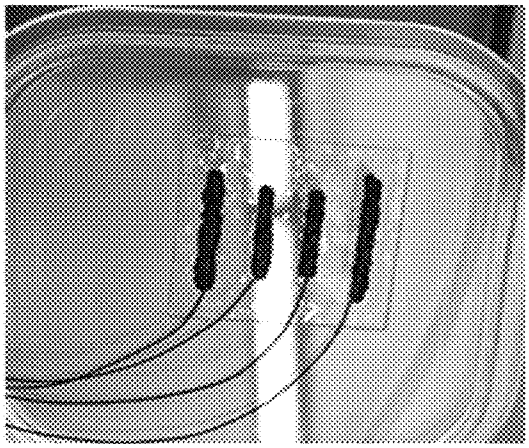
Figure 3C:
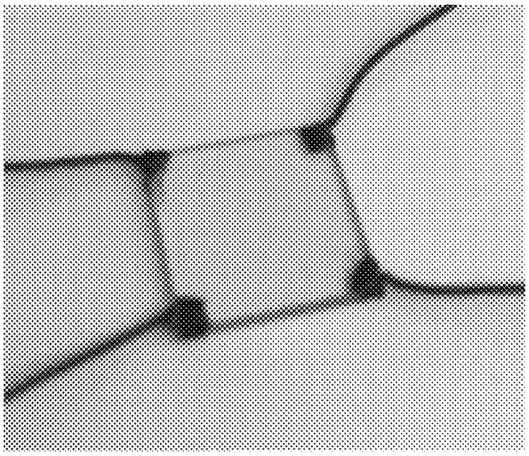
Figure 3D:
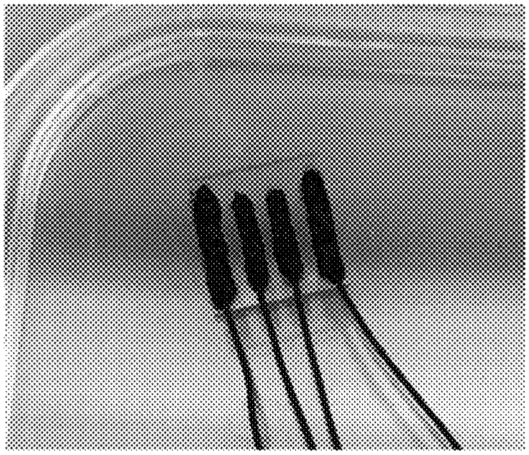
Figure 3E:
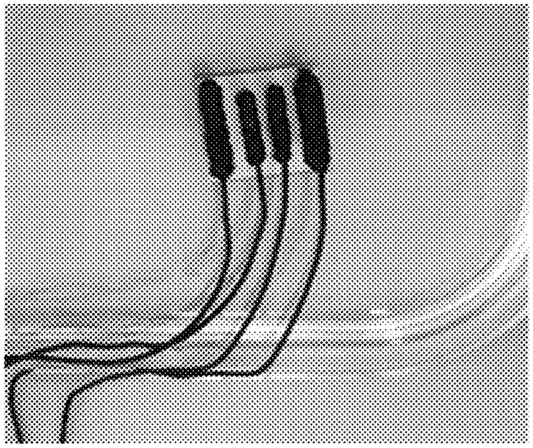

Electrically conductive epoxy was used (silver being the main conductive ingredient) and infused with graphene particles (resistance: 0.0005 Ohms×cm$^{-1}$). FIG. 3 shows the two different four point geometries that were used—one with electrodes in the corners and the other in a row configuration (hence referenced as G1 and G2 respectively from this point onwards). For the G2 configuration, the inner electrodes measure the current, and outer electrodes apply a voltage bias. FIGS. 3A-B are one-inch square quartz substrates with a monolayer of graphene between the electrodes and substrate. FIGS. 3C-D are one-centimeter square perovskite scintillator substrates (C-D are YAP, and E is YAG). FIGS. 3C-E have a monolayer of graphene between the electrodes and substrate. Additionally, another device was made, and looks like FIG. 3D, but has hBN and graphene between the electrodes and substrate (creating a hetero-structure). Electrical measurements were taken on a Kiethley 2450 source-meter. The temperature gradient was supplied by a SCILOGEX® MS-H280-Pro Hotplate. Electromagnetic fields (EMF) were measured with a radiofrequency (RF) EMF strength meter—Brand: EXTECH®, Model: 480836, 50 MHz-3.5 GHz EMF meter. The EMF meter is able to measure electric fields in all 3 dimensions, and is able to distinguish the strength of each field independently.

Results

Graphene+Quartz: Temperature Gradient

Figure 4:
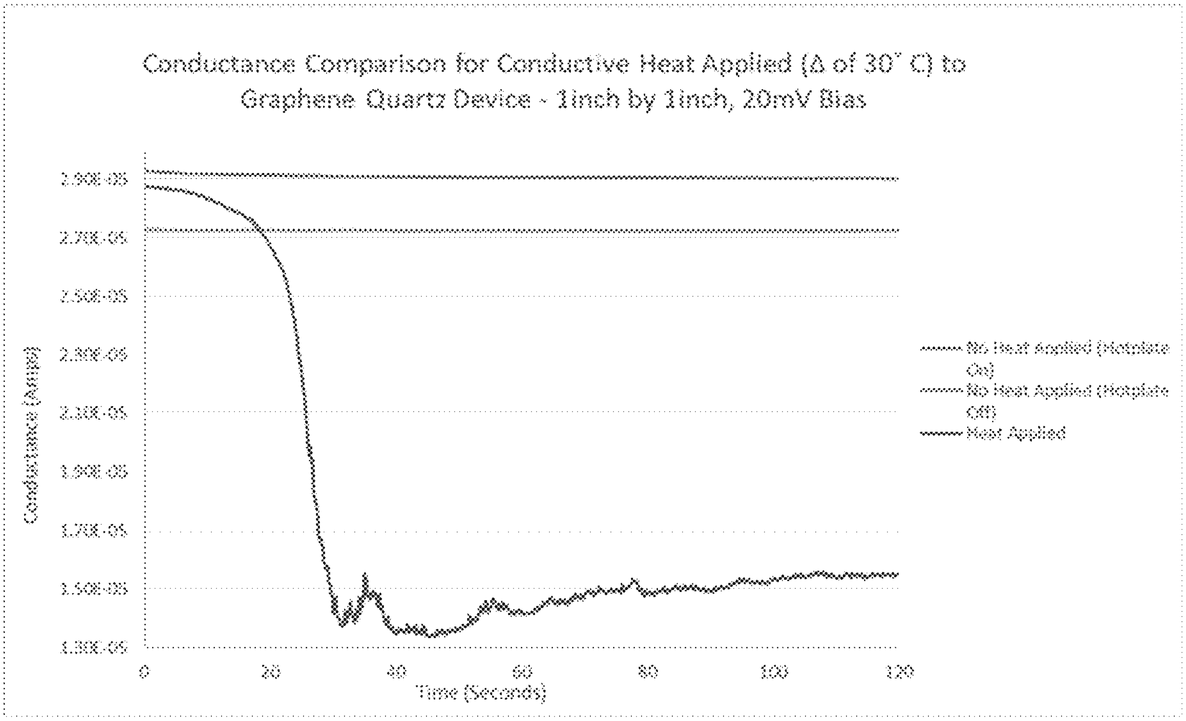
FIG. 4. Quartz device with a G1 electrode configuration to a $\Delta T$ of 30° C. with a +20 mV bias. Hotplate puts out an electric field that gates the device, raising the device conductance from the "No Heat Applied (Hotplate Off)" line to the "No Heat Applied (Hotplate On)" line.

The quartz device with a G1 electrode configuration with a +20 mV bias applied was subjected to a thermal gradient of 30° C. (FIG. 4). A signal of approximately 14 uAs was generated. It was noticed that the vertical electric field back-gated the device and raised the conductance (moved the Fermi level away from the Dirac point on the Dirac curve) of the operating point on the device. The device displays linear characteristics—the larger the bias, the larger the signal generated. The quartz devices should have a lower pyroelectric coefficient, as the quartz only has trace amounts of the ferroelectric material—aluminum (14 ppm). The device was noticed to continue putting out a charge for several minutes after the heat was applied. This is believed to be partially due to the hotplate continuing to supply heat as it cools down, and to the polarization of excited charges continuing to produce a current until the excitation mechanism relaxes. The "Heat Applied" line, shown in FIG. 4, does not start on the "No Heat Applied (Hotplate On)" line as the heat was applied slightly before the measurement being recorded—and thus the current had already started to drop.

Figure 5:
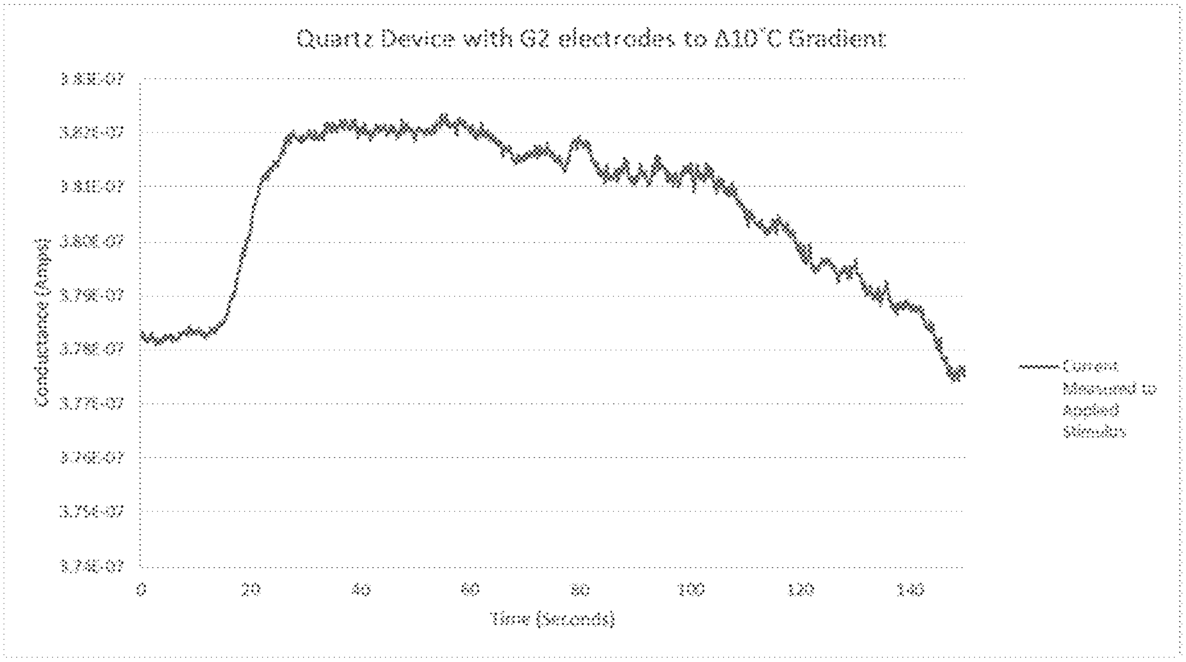
FIG. 5. Quartz device with a G2 electrode configuration to a $\Delta T$ of 10° C.

FIG. 5 shows a positive current yield; proving that not only can the electrical signals be used for sensors, detectors, and spectroscopy—but energy harvesting as well. The collected signal is smaller in magnitude, as the temperature gradient applied is reduced from FIG. 4. Another feature noticed with small thermal gradients, is that the devices recover back to their operating voltage while the thermal gradient is still being applied. This is in contrast to FIG. 4, where the devices administered with larger thermal gradients (up to Δ30° C.) hold the charge for significantly longer periods (for leakage reasons mentioned in the "Pyroelectric Effect" section. Any thermal gradient above Δ30° C. produce no increase in magnitude of the electrical signal recorded; as the polarization mechanism saturates out for the given atomic density. In some embodiments, there can be both a positive and negative delta in temperature. These conditions regarding the electrical signals measured, as a function of the thermal gradient administered to all the different types of device substrate tested, holds true. In certain cases, devices displayed a change in current for hours after large thermal gradients were applied—due to polarized charges staying excited. The quartz devices have a smaller pyroelectric coefficient compared to the perovskite devices, and for that reason, larger electrical signals were measured to relative thermal gradients in the perovskite devices (including taking into consideration to keep the electrode geometries when comparing the data).

Graphene+YAP

Figure 6:
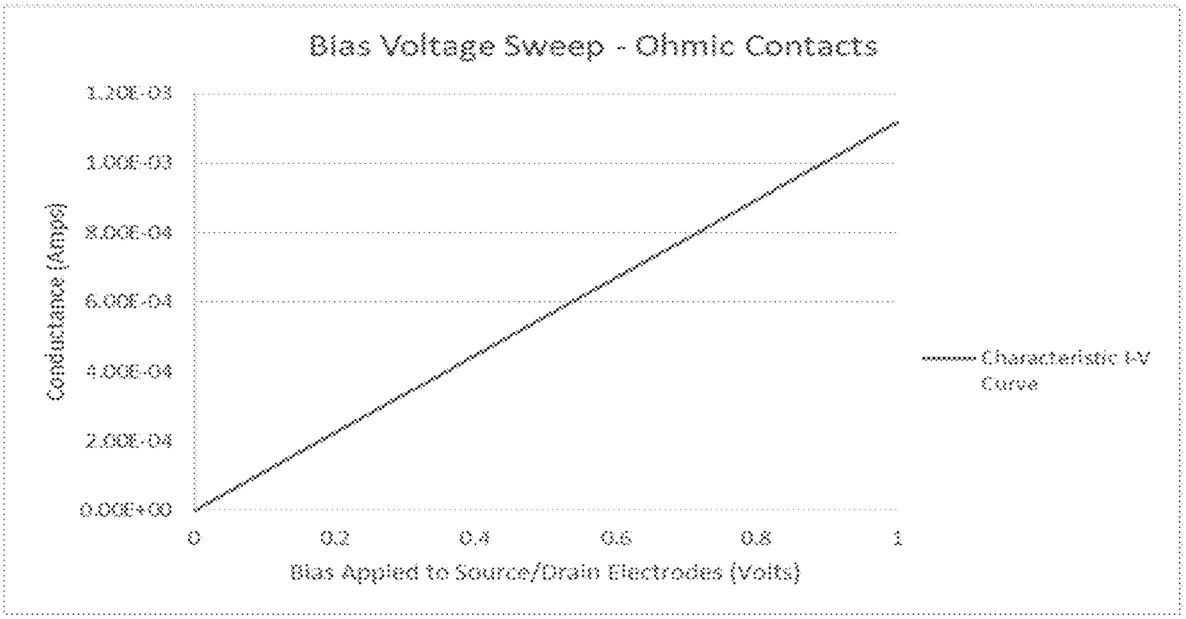
FIG. 6. Device with G2 electrode configuration. The perovskite scintillator devices display linear I-V characteristics, and significantly superior conductance over the quartz devices.

The graphene devices can be thought of as a resistor, the lower the operational resistance on a given substrate, the greater the operational conductance will be. Given that a change in electrical conductance to an external stimulus applied (heat, for example) is a percentage of the operational conductance at a given applied bias; it is advantageous to have a higher conductance operational point for a given bias voltage. The perovskite scintillators all display this beneficial trait—and thus yield larger signals for the same given conditions. Additionally, the linear regression of the I-V sweep is significantly greater than the quartz devices—providing the conditions of a superiorly sensitive device (FIG. 6). The linear characteristic reveals that the electrical connections are ohmic contacts. The breakdown in current occurs at approximately 8 volts bias.

Electric Field

Figure 7:
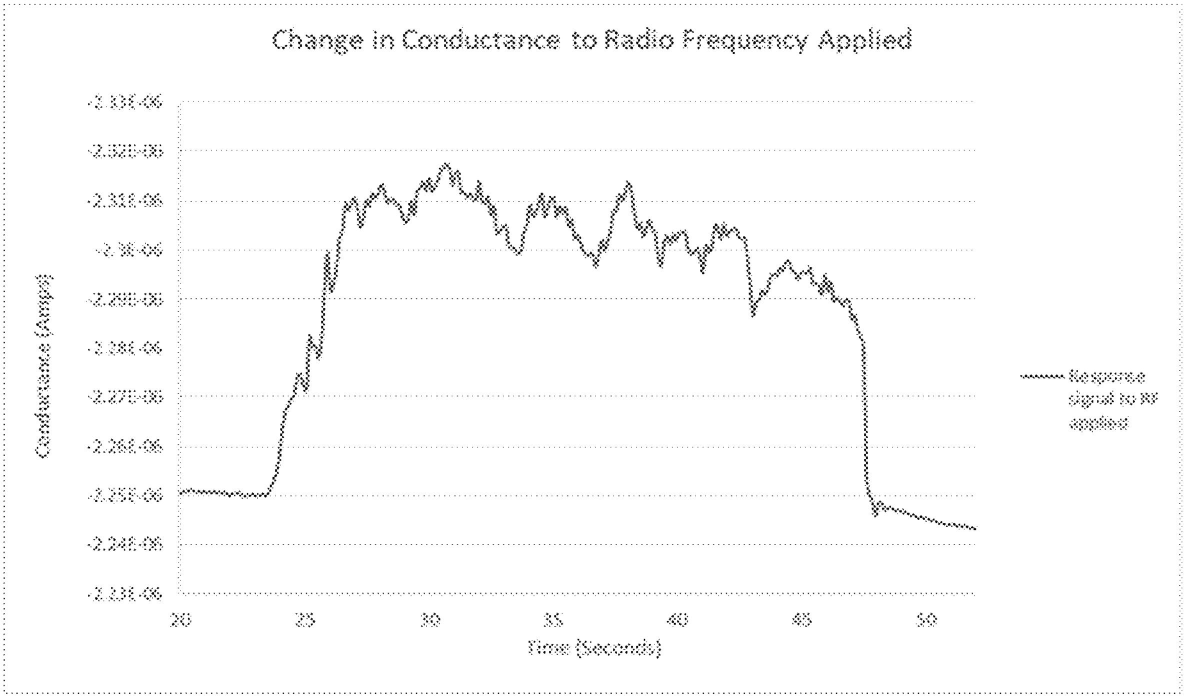
FIG. 7. Positive current generated to an electric field applied with a +20 mV bias.

The YAP perovskite devices displayed a response to electric fields, as shown in FIG. 7, where no temperature gradient is being applied. At lower biases (0-20 mV), the devices become more sensitive to electric fields—including human movement. Indeed, human movement alone at zero bias applied, can generate a 6,000% change in current, positive or minus, from its operational point (1 nA to 60 nAs).

Temperature Gradient–Large Bias Applied

Figure 8:
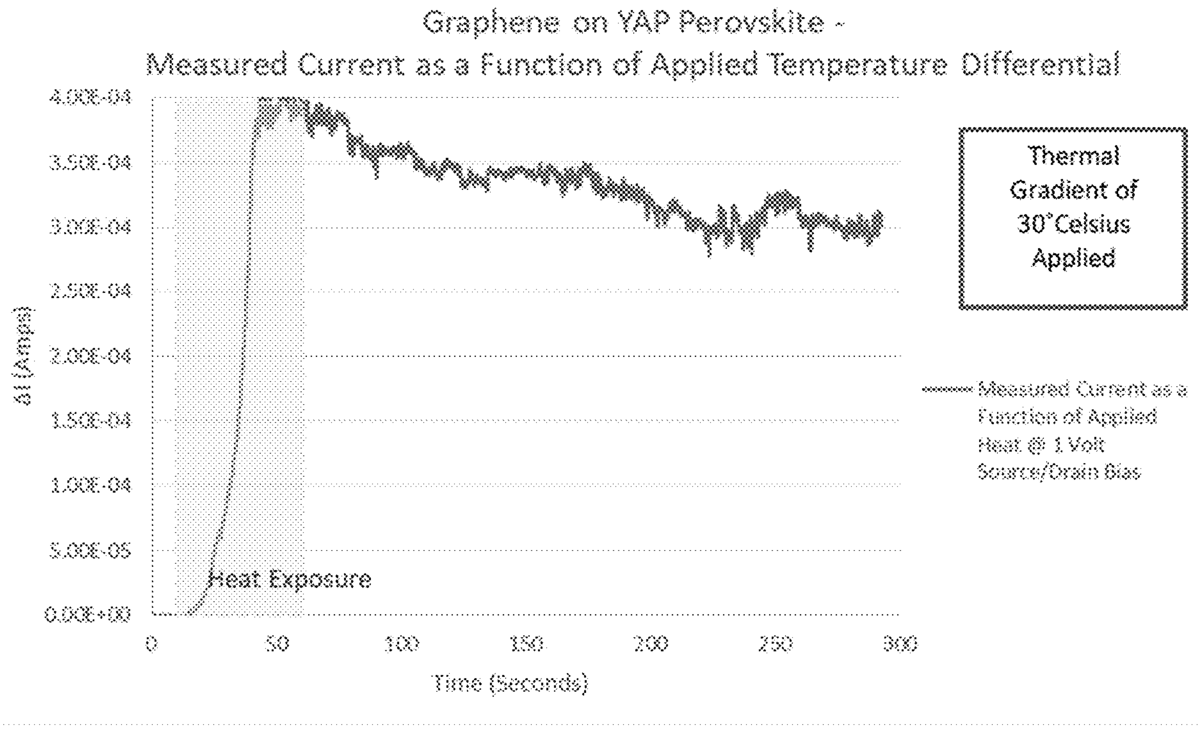
FIG. 8. Normalized graph of electrical measurements taken for G2 electrode configuration to Δ30° C. with 1 volt bias applied. The highlighted region illustrates the period of time that the ΔT was applied—and the change in charge generated continuing for several minutes after the stimulus was applied.

As shown in FIG. 8, a larger electrode bias is able to generate a larger change in the electrical signal collected (~350 uAs as shown for a 1 volt bias). Due to the linear I-V characteristics out to 6 volts before the device current starts to break down, the larger the electrode bias, the larger the collection signal will be. A measurement of 600 uAs was recorded to a ΔT of 30° C. with a 2 volt bias. As previously mentioned, the longevity in which the electrical current can be measured, is a function of the ΔT applied.

Temperature Gradient–No Bias Applied

Figure 9:
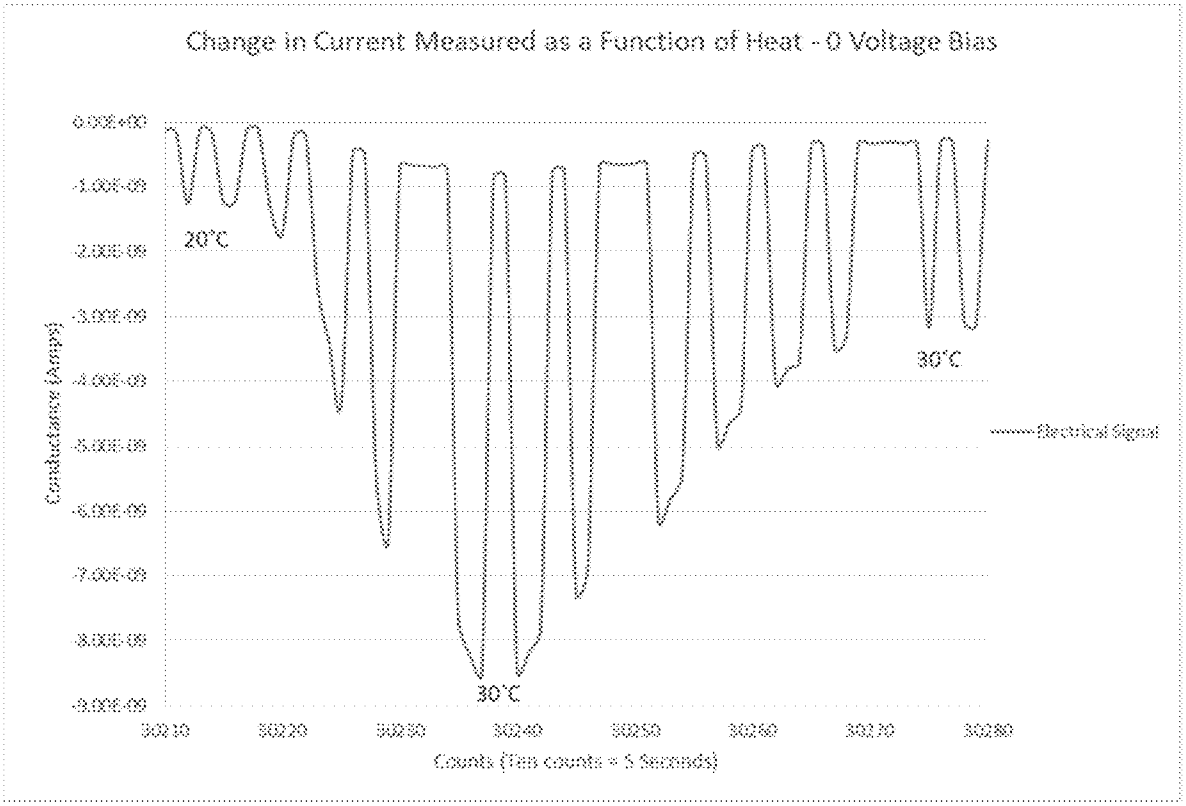
FIG. 9. At zero volts bias, the device current can be seen oscillating between being gated, and not gated. When a ΔT of 10° C. is applied, a responsivity of 75% $K^{-1}$ can be observed—generating an increase in current.

All of the differing devices were characterized for both positive and negative bias voltages: set at 20 mV, 500 mV, and 1 volt. However, due to the observation of electric fields having an effect on the devices at lower bias voltages, it was decided that the devices should be characterized at 0 bias voltage also. FIG. 9 shows the signal generated when measuring heat and the electric field put out by the hotplate at the same time, when no bias is being applied. The ambient background electrical field in the room is $$2\left[\frac{mV}{m}\right],$$

and when the hotplate is turned on, a vertical electric field of $$13\left[\frac{mV}{m}\right]$$

is being applied. The signal starting on the left of FIG. 9 shows the oscillating frequency of the devices operational current. At ambient conditions, the device sits at −1 nAs. When the field is being applied, it back gates the device, reducing the current to ~150 pAs. When a ΔT of 10° C. was applied, the current increased from ~−1 nA to −8.5 nA. Resulting in a responsivity of TCR to be 75% $K^{-1}$. Due to a small ΔT applied, the device returned back to its operational current due to leakage.

Scanning Photo-Current Measurement

Figure 10:
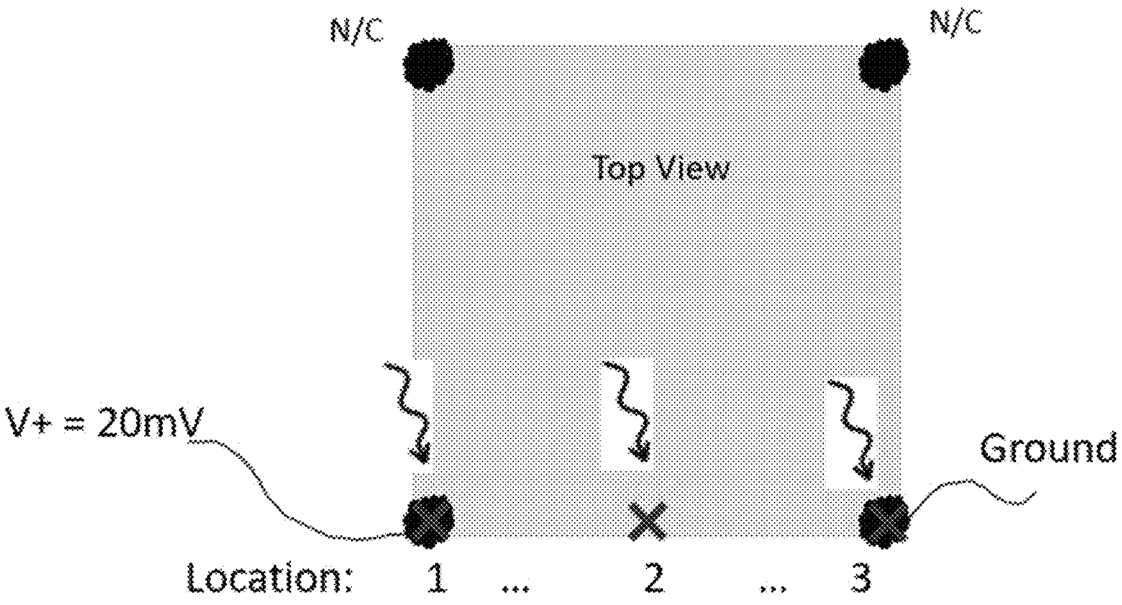
FIG. 10. A 2-point electrical set-up for the measurements taken, and the three placements chosen for the photon wavelengths applied is shown.

A scanning photocurrent measurement (SCM) was done to see if the electrical signal collected could be improved on, based upon the primitive geometry of the electrode configuration chosen for the experiments conducted. The device was tested to compare the dark current at 20 mV, at three locations, to the illuminated current at 20 mV (FIG. 10). This was done to measure the photocurrent response of the device, to find where the electric current was being pulled from, and if the device was more responsive to shorter or longer wavelengths.

Figure 11:
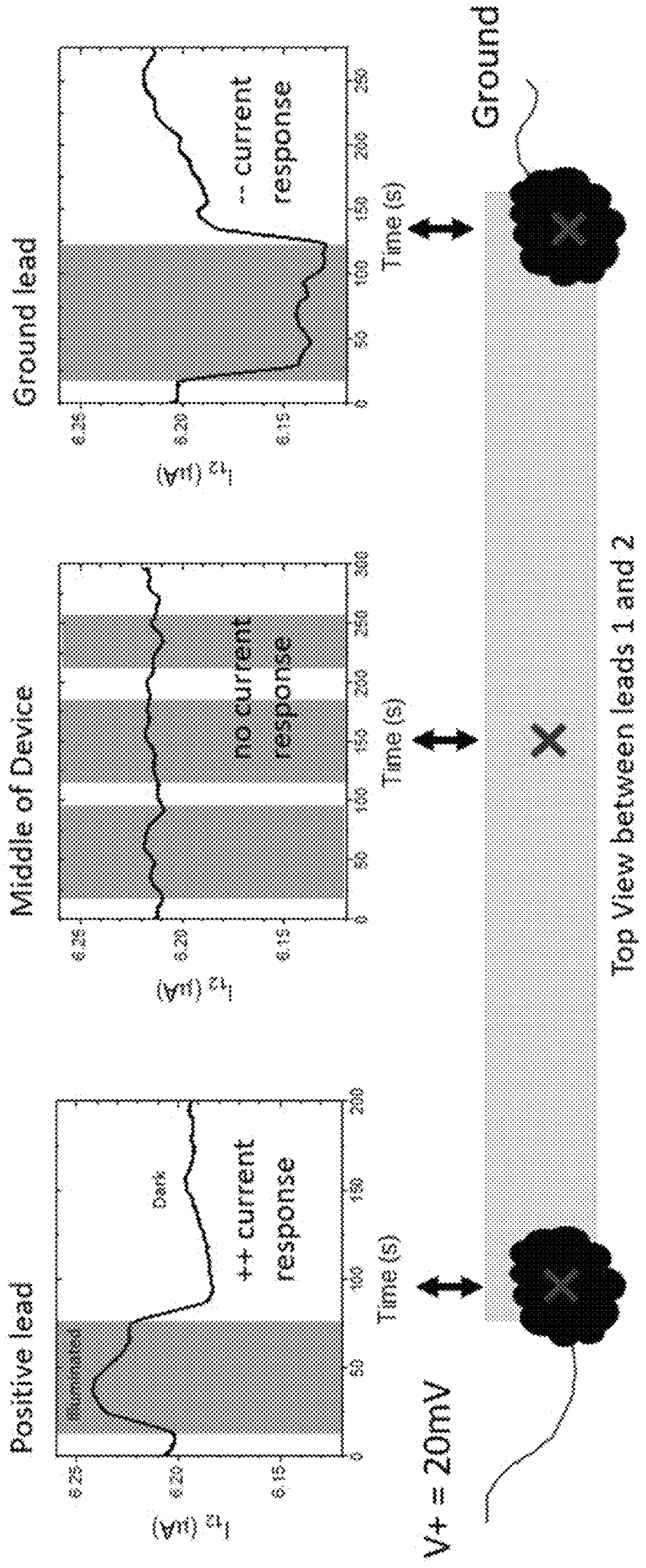
FIG. 11. The electron collection signal is only being generated around the electrodes, due to the carrier lifetime.

A photocurrent was observed—shown in FIG. 11 (stimulus: photon wavelength at 800 nm and 170 mW intensity). However, the response was only observed around the electrodes. The results suggest that for the wavelength tested, that any optimization regarding finer electrode resolution (tighter spacing), should yield significantly greater electrical responses—as exciton diffusion lengths are typically in the sub-micron range. Pixelated electrodes would also offer another solution to increasing the electrode collection area. To further understand how best to collect the charge carriers generated, the test could be run again, but this time with 20 nm thick gold electrodes deposited via thermal deposition. Gold at this thickness is partially transparent to the wavelengths used in this experiment, and it would then be possible to measure electron excitement and charge transport lengths directly underneath the electrodes, and directly off the electrodes, to see how far from the electrodes the charges are being collected.

Figure 12A:
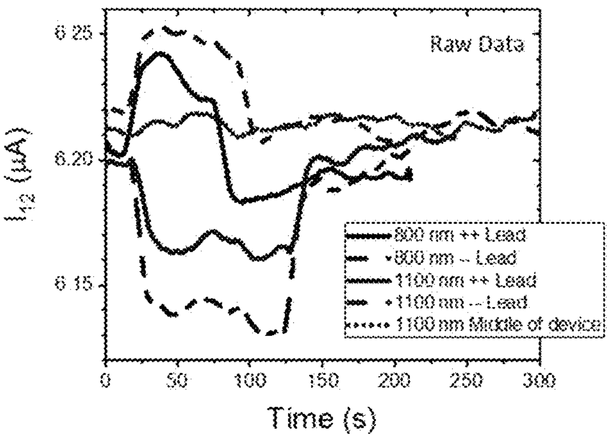
FIGS. 12A-B. (A) Graphene+YAP response to photoexcitation 800 and 1100 nm—with 20 mV bias applied. (B) Normalized data so that the magnitude of response could be compared to the different wavelengths applied.
Figure 12B:
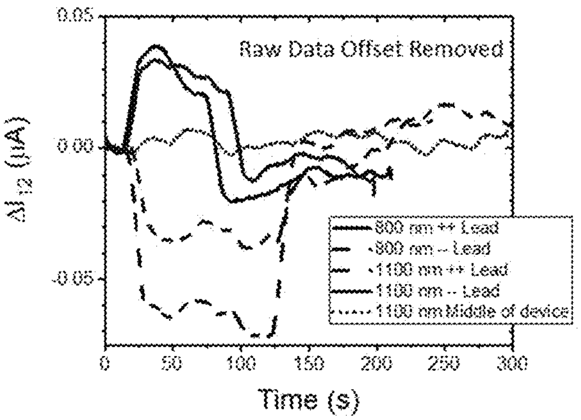
Figure 13:
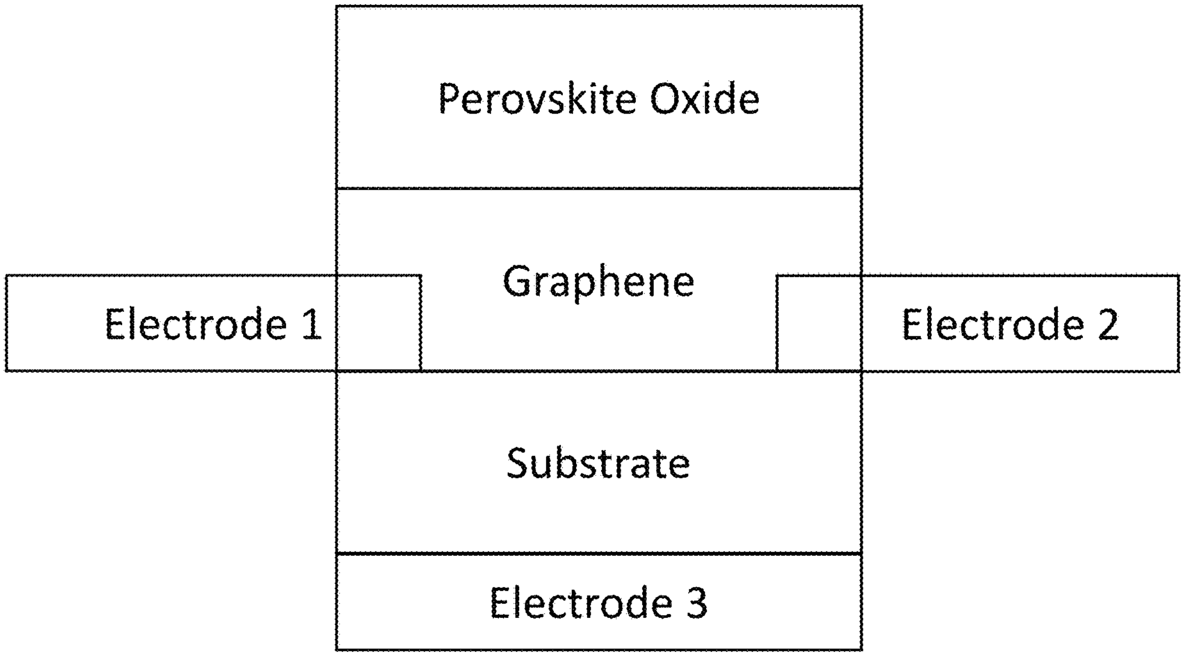
FIG. 13. Schematic of a supercapacitor according to some embodiments of the disclosure.
Figure 14:
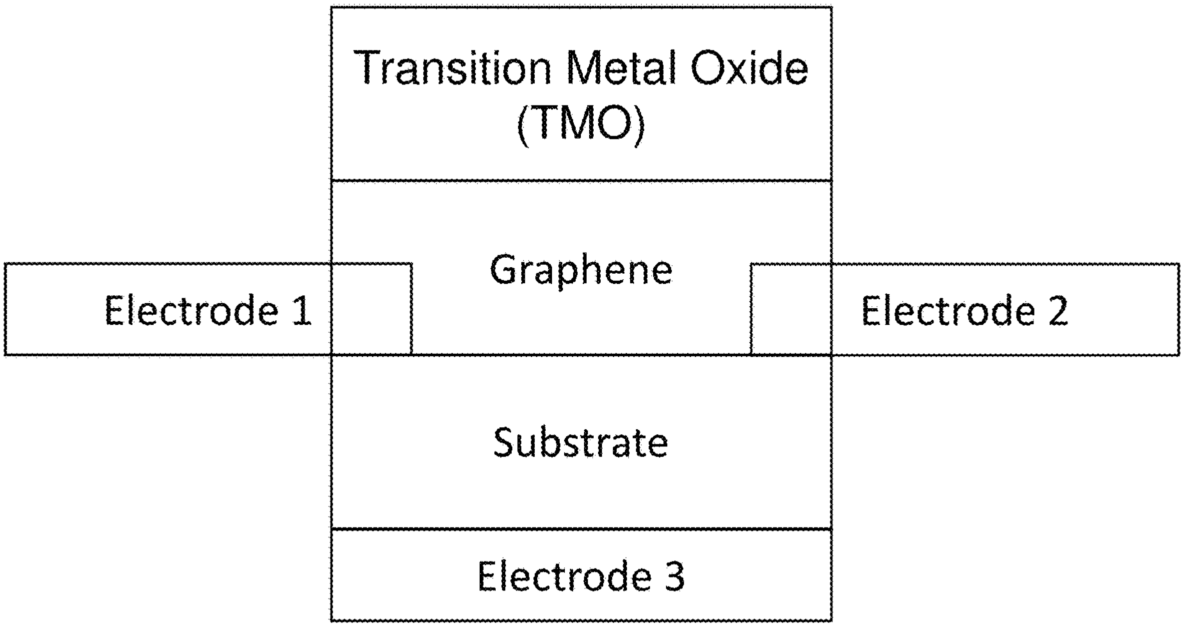
FIG. 14. Schematic of a supercapacitor according to some embodiments of the disclosure.
Figure 15:
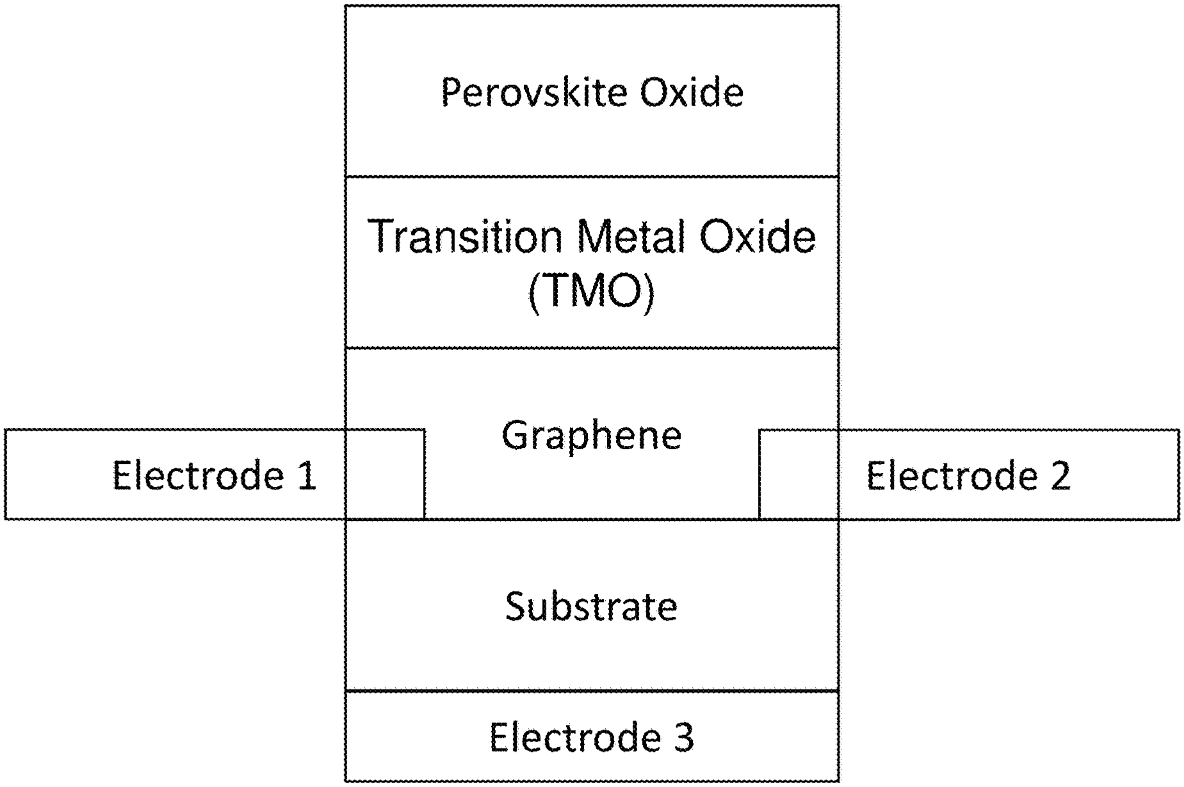
FIG. 15. Schematic of a supercapacitor according to some embodiments of the disclosure.
Figure 16:
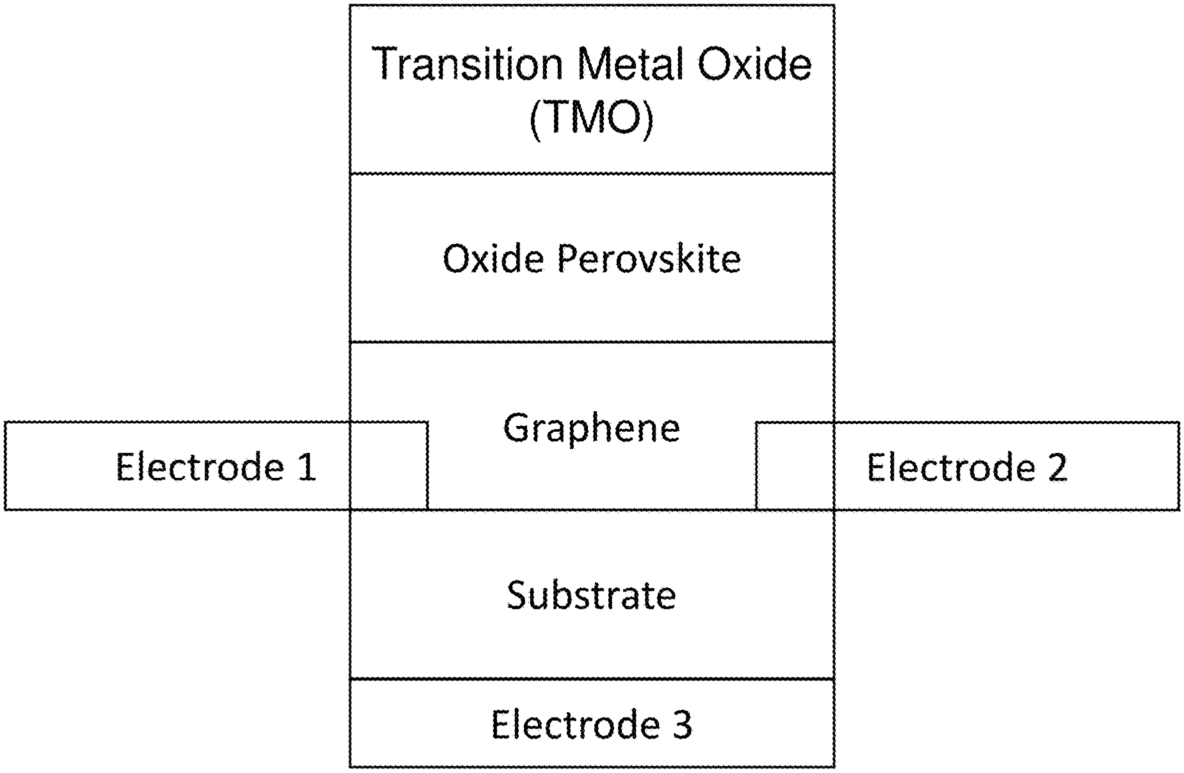
FIG. 16. Schematic of a supercapacitor according to some embodiments of the disclosure.

The experiment was then repeated at 1100 nm at the same 170 mW excitation power with broad (unfocused, but collimated) laser illumination (FIG. 12A). The data has been normalized (FIG. 12B), so that the magnitude of response could be compared to the different wavelengths applied. The 800 nm wavelength generated a larger signal when compared to the 1100 nm wavelength. Both positive and negative currents were generated, although, the largest response is generated from a negative bias.

hBN+Graphene+YAP

The hBN+graphene hetero-structure on YAP device offered the same magnitude of electrical results as the graphene on YAP devices, when a ΔT was introduced. Whether the bias was positive or negative, small or large, or any varying ΔT within the 0-30° C. range, the results were comparable to that of the graphene on YAP device. However, one surprising result was observed: the hBN acted as a dampener to electromagnetic fields. Whether the EMF stimulus was the hotplate or human movement, the device was not affected in any significant way like the graphene on YAP device. This could be useful, should EMF cancelation be desired. These hetero-structure devices also measured in the same magnitude of radiation compared to the monolayer devices.

Graphene+YAG

Graphene+YAG also offered the same magnitude of results to the applied stimulus as the mono and hetero-structure YAP devices. It was noticed however, that this device was significantly lower in operational resistance, in comparison to the other devices (~650 kΩ versus 1 kΩ). As mentioned previously, the lower the device operational resistance, the greater the signal to stimulus expected— indeed, at 1 volt bias applied, the operational current was greater than the rest of the devices. Unfortunately, when placing this device on the hotplate and turning the heat function on, the operational current was lowered (all other devices had an elevation in operational current, as it would lower the device resistance). Given that the vertical field is still measuring in the same direction (equivalent of a $-V_{BG}$ with the same magnitude which was measured to confirm), shows that the YAG substrate electrically n-dopes the graphene, such that when the Fermi level is lowered in the n-type regime from the EMF applied. This confirms why the operational current is lowered.

Control Measurement

A 1"×1" quartz substrate, with silver epoxy (infused with graphene particles) electrodes in G1 formation, was characterized and tested. The absence of the CVD graphene monolayer resulted in a device that had an overload resistance. This is expected, as the quartz (which is simply glass) is a dielectric material (insulator). The device was then placed onto the hotplate, and a thermal gradient of 30° C. was applied. There was no change in current observed. Given that the only difference in the control device compared to the graphene quartz device is the graphene thin-film; confirms that the data obtained is indeed from the properties of graphene.

Discussion

For several different electrode geometries, bias voltages, substrates, and external stimulus at differing magnitudes, it was observed that graphene and graphene hetero-structures are responsive on perovskite scintillators. Both negative and positive current generations were recorded, depending on the condition of the experimental constraint. The graphene-perovskite scintillators demonstrated larger responses to thermal gradients; this is because the graphene has a larger polarization response to measure, due to the pyroelectric coefficient being greater in the perovskite devices. Larger biases applied to the devices, generated larger collection signals. Larger thermal gradients were able to provide measurable currents for a few hours even after stimulus had been turned off, and the hotplate had cooled down. This is explained by the fact that perovskites can stay polarized for relatively long periods of time, until the crystal lattice has de-excited to its ground state. A specific heat calculation was performed to ensure that no entropy or thermodynamic laws were violated (energy coming out of the system was not more than the energy going into the system).

The hetero-structure offers several advantages over the mono-layer thin film; depending on the function required. As shown in our observations, electric fields can be eliminated out of the electrical signal—should electromagnetic fields disturb the discrimination of the electrical signal collected. Additionally, hBN could act as a dual function, as it can be used to encapsulate the graphene layer so the ambient environment does not oxidize the thin-film. Furthermore, hetero-structures like that of $MoS_2$ and graphene on scintillators have since shown promising potential on differing substrates; such as electrical gains of $10^5$ $A \cdot W^{-1}$ to visible photoexcitation wavelengths.

While the invention has been described in terms of preferred embodiments, those skilled in the art will recognize that the invention can be practiced with modification within the spirit and scope of the appended claims.

The invention claimed is:

1. A supercapacitor, comprising a perovskite oxide and a transition metal oxide substrate, a graphene monolayer arranged on the substrate, and at least two electrodes, wherein the graphene monolayer is arranged between the substrate and the at least two electrodes.

2. The supercapacitor of claim 1, wherein the perovskite oxide substrate is a yttrium aluminum perovskite (YAP) or yttrium aluminum garnet (YAG) substrate.

3. The supercapacitor of claim 1, further comprising a hexagonal boron nitride (hBN) thin film arranged between the graphene monolayer and the at least two electrodes.

4. The supercapacitor of claim 1, wherein the at least two electrodes comprise a conductive epoxy.

5. The supercapacitor of claim 4, wherein the conductive epoxy comprises silver and graphene particles.

6. The supercapacitor of claim 1, wherein the at least two electrodes comprise graphene.

7. A supercapacitor, comprising a perovskite oxide substrate, a graphene monolayer arranged on the substrate, and at least two electrodes, wherein the graphene monolayer is arranged between the substrate and the at least two electrodes, wherein the perovskite oxide substrate is a yttrium aluminum perovskite (YAP) or yttrium aluminum garnet (YAG) substrate, wherein the YAP or YAG substrate is a cerium doped YAP or YAG substrate.

* * * * *